United States Patent
Brown et al.

(10) Patent No.: US 6,826,550 B2
(45) Date of Patent: Nov. 30, 2004

(54) METHOD, SYSTEM, AND PROGRAM FOR CONVERTING APPLICATION PROGRAM CODE TO EXECUTABLE CODE USING NEURAL NETWORKS BASED ON CHARACTERISTICS OF THE INPUTS

(75) Inventors: Michael Wayne Brown, Georgetown, TX (US); Chung Tien Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 09/737,337

(22) Filed: Dec. 15, 2000

(65) Prior Publication Data
US 2004/0122785 A1 Jun. 24, 2004

(51) Int. Cl.⁷ ............................. G06F 15/18; G06F 9/45
(52) U.S. Cl. ............................. 706/15; 706/31; 706/30; 717/136; 717/140
(58) Field of Search ................. 717/104, 105, 717/107, 108, 109, 136, 137, 140, 148; 706/15, 18, 31, 28, 16, 30, 26

(56) References Cited

U.S. PATENT DOCUMENTS

| | | | |
|---|---|---|---|
| 5,129,037 A | 7/1992 | Kirk et al. | 706/16 |
| 5,706,502 A | 1/1998 | Foley et al. | 707/10 |
| 5,805,730 A | 9/1998 | Yaeger et al. | 382/228 |
| 5,903,886 A | 5/1999 | Heimlich et al. | 706/50 |
| 5,946,487 A | 8/1999 | Dangelo | 717/148 |
| 5,966,538 A | 10/1999 | Granston et al. | 717/158 |
| 6,018,628 A | 1/2000 | Stoutamire | 717/147 |
| 6,226,788 B1 * | 5/2001 | Schoening et al. | 717/107 |
| 6,282,697 B1 * | 8/2001 | Fables et al. | 717/107 |
| 6,578,020 B1 * | 6/2003 | Nguyen | 706/15 |
| 2002/0066074 A1 * | 5/2002 | Jabri | 717/105 |

FOREIGN PATENT DOCUMENTS

| | | | | |
|---|---|---|---|---|
| EP | 2366016 A | * | 2/2002 | G06F/9/45 |

OTHER PUBLICATIONS

Thrun, S., "A Framework for Programming Embedded Systems: Initial Design and Results", Technical Report CMU-CS-98-142 Carnegie Mellon University, 1998, Retrieved from the Internet: http://citeseer.nj.nec.com/article/thrun98framework.html.*

Yellin, F., "The JIT Compiler API", Java Website, Oct. 1996, Retrieved from the Internet: http://java.sun.com/docs/jit_interface.html.*

(List continued on next page.)

*Primary Examiner*—Wilbert L. Starks, Jr.
*Assistant Examiner*—Kelvin Booker
(74) *Attorney, Agent, or Firm*—David W. Victor; Konrad, Raynes & Victor LLP

(57) ABSTRACT

Provided is a compiler to map application program code to object code capable of being executed on an operating system platform. A first neural network module is trained to generate characteristic output based on input information describing attributes of the application program. A second neural network module is trained to receive as input the application program code and the characteristic output and, in response, generate object code. The first and second neural network modules are used to convert the application program code to object code.

39 Claims, 8 Drawing Sheets

OTHER PUBLICATIONS

Nigri et al., "Silicon Compilation of Neural Networks", Proceedings of the 5th Annual European Computer Conference, May 1991, pp. 541–546.*

Prechelt, L., Exploiting Domain–Specific Properties: Compiling Parallel Dynamic Neural Network Algorithms into Efficient Code IEEE Transactions on Parallel and Distributed Systems, Nov. 1999, vol. 10, No. 11.*

Sun Microsystems. The APPLET Tag [online], 1996, JDK Contents, pp. 1–3, [retrieved on Aug. 24, 2001]. Retrieved from the Internet.

Sun Microsystems. Applets Power The Client [online], Oct. 18, 1999, The Source for Java Technology, java.sun.com, pp. 1–7, [retrieved on Aug. 24, 2001]. Retrieved from the Internet.

Sun Microsystems. APPLETS [online], Nov. 20, 2000, The Source for Java Technology, java.sun.com, pp. 1–2, [retrieved on Aug. 24, 2001]. Retrieved from the Internet.

Donald R. Tveter. Chapter 2 The Backprop Algorithm [online], Jan. 19, 2000, pp. 1–13, [retrieved on Aug. 24, 2001]. Retrieved from the Internet <URL: http://www.dontveter.com>.

U.S. application Ser. No. 09/455,705 "Method And System For Converting Code To Executable Code Using Neural Networks Implemented In A Very Large Scale Integration (VLSI) Integrated Circuit" Filed on Dec. 7, 1999.

S. Haykin. "Neural Networks: A Comprehensive Foundation" 1994, pp. 518–526.

Teuvo Kohonen. "The Self–Organizing Map" pp. 74–89. Reprinted from PROC. IEEE, vol. 78, no. 9, Sep. 1990, pp. 1464–1480.

* cited by examiner

METHOD, SYSTEM, AND PROGRAM FOR CONVERTING APPLICATION PROGRAM CODE TO EXECUTABLE CODE USING NEURAL NETWORKS BASED ON CHARACTERISTICS OF THE INPUTS

BACKGROUND OF THE INVENTION

1. Field of the Invention

The present invention relates to a method, system, and program for using neural networks for converting application program code to executable code based on characteristics of the inputs.

2. Description of the Related Art

The Java** Platform provides an added layer of execution between the underlying operating system and programs written in the Java computer language. The Java Platform converts Java source code (.Java files) to bytecodes (.class files), which are machine independent representations of a Java class. Thus, the same bytecodes would be created for all operating system platforms. The bytecodes are then inputted to a Java Virtual Machine program that converts the bytecodes to the object code in the native machine language of the operating system on which the Java Virtual Machine is installed. Thus, there is a platform-specific Java Virtual Machine program for each platform on which Java programs can execute.

**WINDOWS and MICROSOFT are registered trademarks of Microsoft Corporation; AIX, OS/2 are registered trademarks of IBM; JAVA is a trademark of Sun Microsystems, Inc.

The Java Virtual Machine typically includes two components, an Interpreter and a Just-In-Time (JIT) Compiler. The bytecodes are either interpreted by the Interpreter or turned into native machine code by the JIT Compiler. The native code may then be executed to run the Java program. The JIT Compiler is intended to generate code faster for certain methods that are called frequently. The JIT operates by searching for strings having a recognizable pattern in the bytecodes. The JIT provides a mapping of such recognizable strings of bytecodes to native code statements. The JIT compiler reuses copies of translated bytecodes to speed up the compilation process. In this way, the JIT Compiler can quickly convert recognizable segments of the byte code to native code.

FIG. 1 illustrates the prior art method for converting Java source code to executable native machine code through the use of the Java Interpreter and JIT Compiler.

Java source code may be encapsulated in a Java program referred to as a Java Applet, which is an application program that executes within a Java enabled viewing program, such as an Internet web browser. Both the Microsoft Internet Explorer and Netscape Communications Corporation Internet web browsers include a Java Virtual Machine (JVM) to execute the Java applet code.** Unlike general Java programs, Applets cannot be executed directly from the operating system.

**WINDOWS and MICROSOFT are registered trademarks of Microsoft Corporation; AIX, OS/2 are registered trademarks of IBM; JAVA is a trademark of Sun Microsystems, Inc.

To load an Applet program into the browser environment, a special Hypertext Markup Language (HTML) Applet tag is embedded in an HTML page that instructs the browser to load the compiled Java bytecodes for a Java applet program from a universal resource locator (URL) address. The browser JVM would then convert the Applet bytecodes to native machine code. Applets are commonly included in Internet web pages to deliver content and programs over the Internet. Applets have built in security features that restrict their ability to read or write files and open additional network connections on the computer in which they are executing.

There is a need in the art for further improvements for transforming Java Applet bytecodes into native code that may be executed by the native operating system platform on which the Java Virtual Machine is running.

SUMMARY OF THE PREFERRED EMBODIMENTS

Provided is a compiler to map application program code to object code capable of being executed on an operating system platform. A first neural network module is trained to generate characteristic output based on input information describing attributes of the application program. A second neural network module is rained to receive as input the application program code and the characteristic output and, in response, generate object code. The first and second neural network modules are used to convert the application program code to object code.

Further, training the second neural network module may involve training a first and second neural network components. The first neural network component is trained to map the application program code to a unique representation of the application program code. The second neural network component is trained to generate executable code from the unique representation of the application program code and the characteristic output.

Still further, the first neural network module may comprise a plurality of characterization neural networks. In such case, training the characterization neural networks comprises determining attribute information of the application program code and transmitting the attribute information to each characterization neural network to determine an application type to which the application program is capable of belonging. The characteristic output indicates the application type for the application program.

The described implementations provide a mechanism for utilizing neural networks to provide a mapping from an input code set, such as Java Applet bytecodes implementing a class, to native machine code. The preferred embodiments are especially useful for substantially reducing the time needed to compile Java Applet bytecodes into native machine code. The described implementations avoid having to interpret any portion of the bytecodes. Instead, neural networks are utilized to map the Java Applet bytecodes to native machine code in a manner that is substantially faster than current Java Virtual Machine implementations using Interpreters and JIT Compilers. The neural networks of the preferred embodiments further reduce compilation time by parallel processing the input bytecodes and by providing a mapping that avoids the need for time consuming interpretation operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
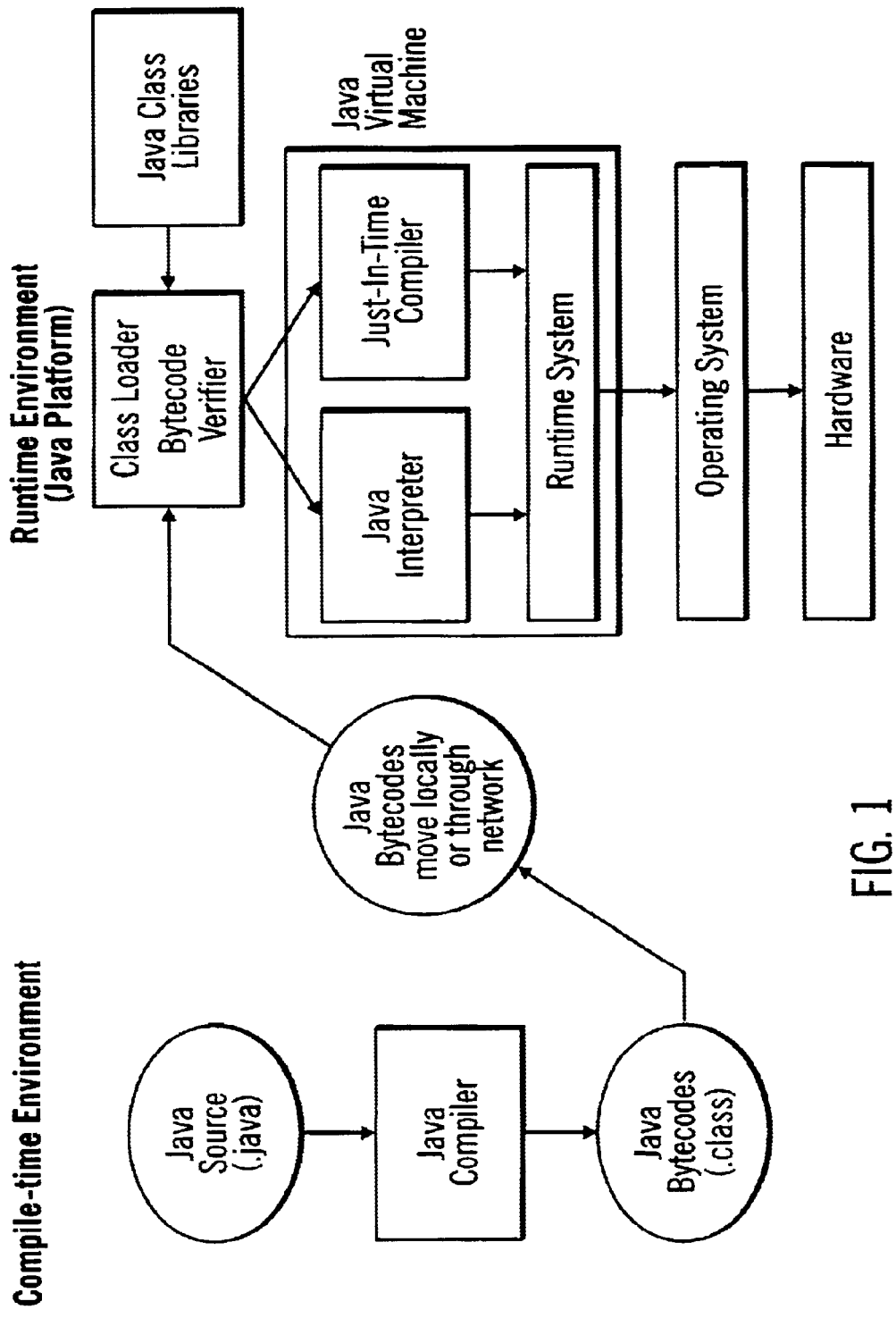
FIG. 1 is a block diagram illustrating a prior art process of converting Java source code to native machine code.
Figure 2:
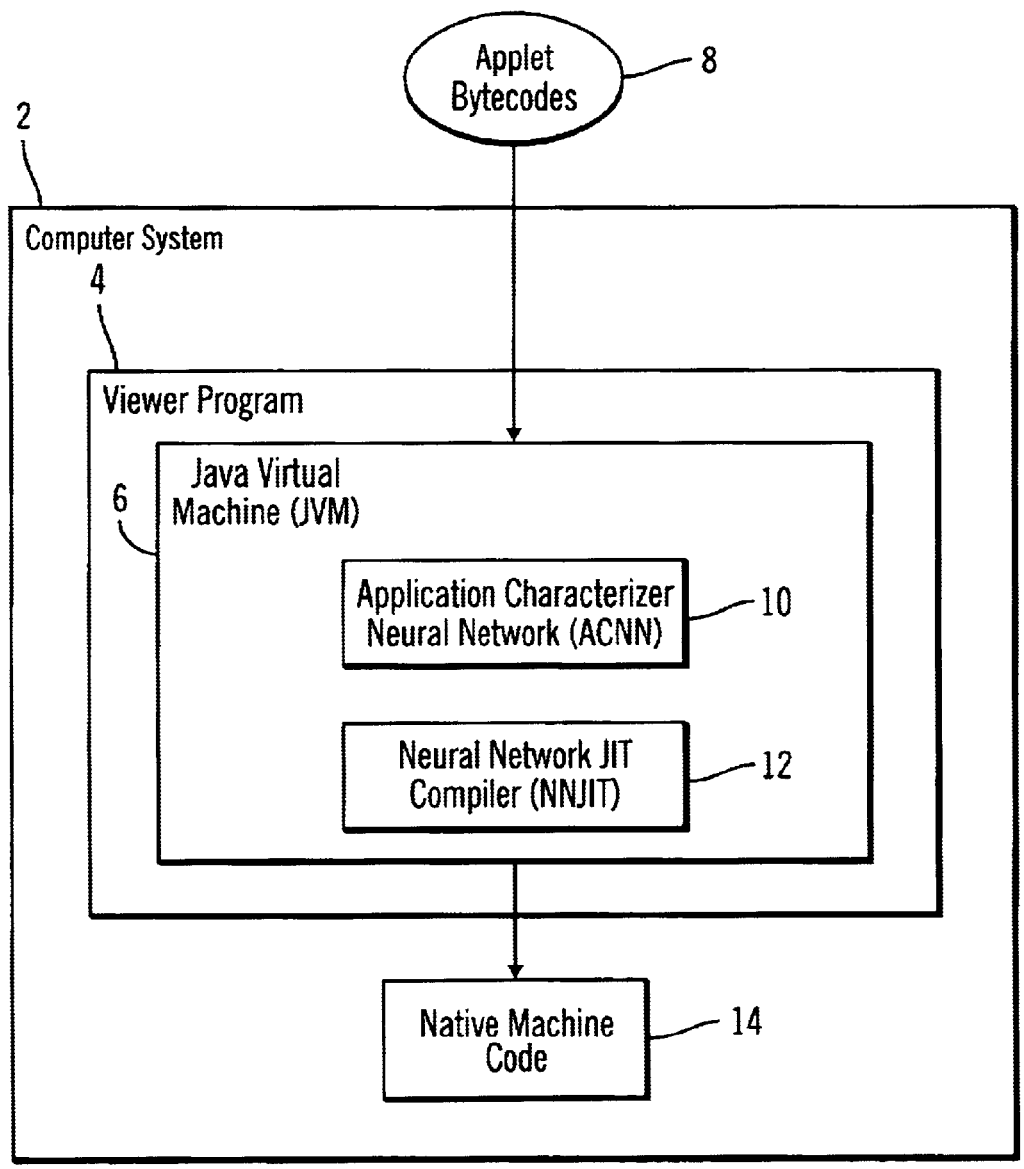
FIG. 2 is a block diagram illustrating the computing environment and components to convert source code to machine code in accordance with certain implementations of the present invention.

FIG. 2 depicts a computing environment in which preferred embodiments are implemented. In the described implementations, a computer system 2 is executing a Java enabled viewer program 4, such as an Internet web browser, that includes a Java Virtual Machine (JVM) 6. The computer system 2 may comprise any computer device known in the art, including personal computers, workstations, mainframes, network computers, handheld computers, telephony devices, etc., and includes an operating system known in the art, such as a Microsoft Windows based operating system, OS/2, AIX, etc.** The viewer program 4 is capable of loading Java Applet bytecodes 8 from within local storage areas of the computer system 2. In network implementations, the viewer program 4 may load the Applet bytecodes 8 from a server over a network in a manner known in the art.

**WINDOWS and MICROSOFT are registered trademarks of Microsoft Corporation; AIX, OS/2 are registered trademarks of IBM; JAVA is a trademark of Sun Microsystems, Inc.

The Java Virtual Machine (JVM) 6 includes an Application Characterizer Neural Network (ACNN) 10 and a Neural Network Just-in-Time (NNJIT) compiler 12 to convert the Applet bytecodes 8 to native machine code 14, which is executable by the operating system of the computer system 2. Further details of a Java Virtual Machine are described in the Sun Microsystems, Inc. publication "The Java Virtual Machine Specification," Second Edition (Copyright Sun Microsystems, Inc., 1996), which publication is incorporated herein by reference in its entirety, and available on the Internet at "http://java.sun.com/docs/books/vmspec/index.html".

The Application Characterizer Neural Network (ACNN) 10 and a Neural Network Just-in-Time (NNJIT) compiler 12 implement a neural network architecture to transform the Applet bytecodes 8 to native machine code 14. The Application Characterizer Neural Network (ACNN) 10 performs an initial processing of the Applet bytecodes 8 and other input information related to the Applet 8 to generate characterization information describing certain attributes of the Applet 8. For instance, the Application Characterizer Neural Network (ACNN) 10 may characterize the Applet bytecodes 8 as an audio, graphics, security, business, scientific, etc., type application. This characterization information is provided as input to the Neural Network Just-in-Time (NNJIT) compiler 12 to use when transforming the Applet bytecodes 8 into native machine code 14. The characterization input narrows the range of possible outcomes the Neural Network Just-in-Time (NNJIT) compiler 12 must process to generate the desired output native machine code 14.

The bytecodes 8 provide all the information necessary to define a single Java class. The bytecodes 8 conform to the Java class file format. The Java class file format, implemented in the Java bytecode 8, defines the representation of a class or interface. The class file format components of the bytecodes 8 include:

Class Definition: includes access flags used to denote access permissions to the class, such as whether the class is private, public, an interface, abstract, etc.

Constant Pool: includes constant values used by the methods in the class.

Interface Implement: indicates classes that must interface with the class represented by the bytecode 8.

Field Table: captures properties and attributes of objects in the class, including access permissions to the object.

Method Table: List of methods of class to perform the tasks of the class.

Attribute Table: definition of attributes used with class definition, field table, and method table segments of bytecode.

The implementation of the six described categories of the bytecode 8 are further described in the publication "The Java Virtual Machine Specification," incorporated by reference in its entirety above.

Figure 3:
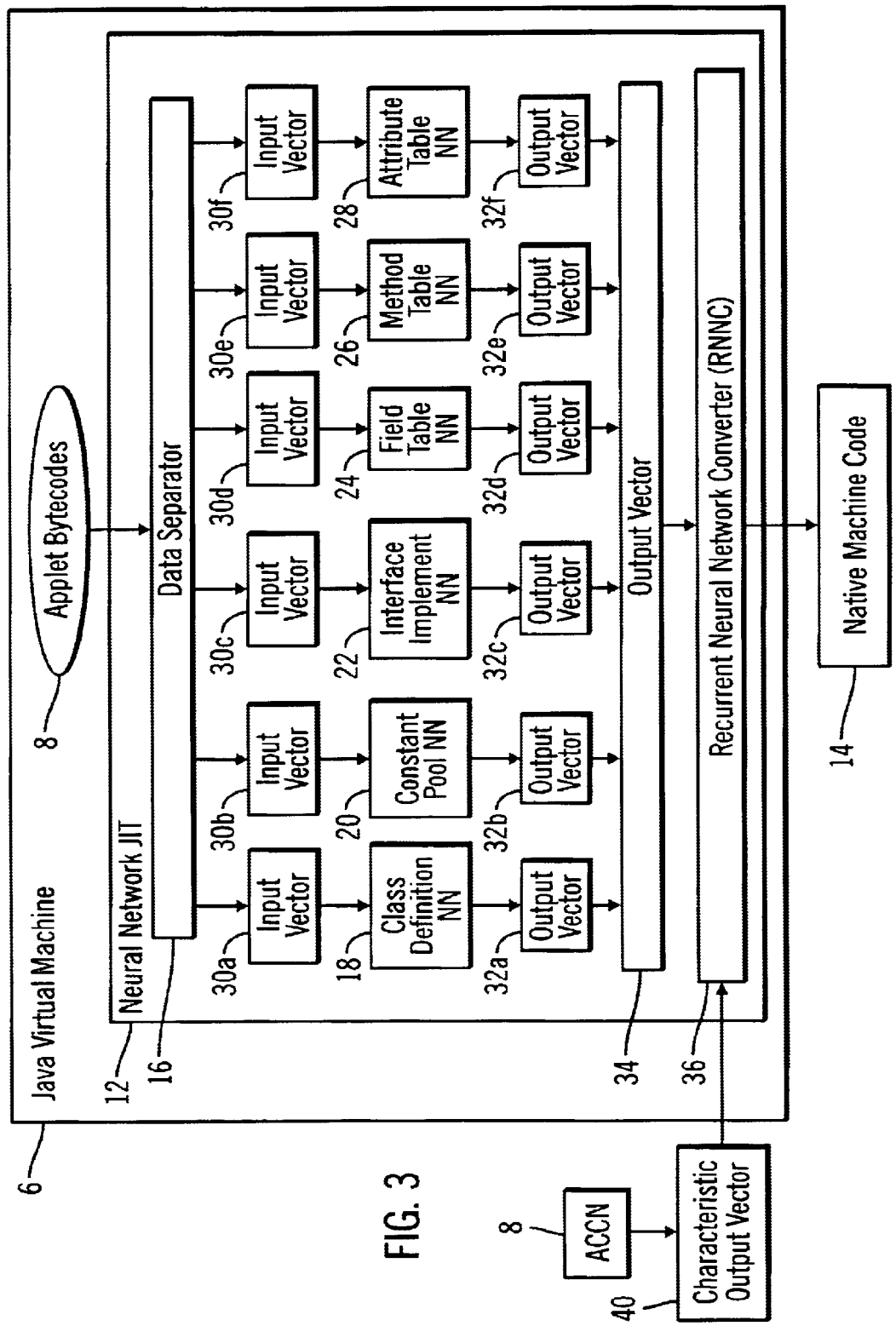
FIG. 3 illustrates the components of a Neural Network Just-In-Time (JIT) Compiler in accordance with certain implementations of the present invention.

FIG. 3 illustrates further detail of the components of the neural network JIT 12, which includes a data separator 16; six neural networks for each of the six above described class file format categories of the bytecode: a class definition neural network (NN) 18, a constant pool neural network, an interface implement neural network 22, a field table neural network 24, a method table neural network 26, and an attribute table neutral network 28; and a recurrent neural network converter (RNNC) 30. The data separator 16 parses the bits of the bytecode 12 into six different vectors 30a b, c, d, e, f, one for each of the six class categories of the bytecode 12. The bytecode 12 has a known format specifying the byte location of each of the class categories in the bytecode, which is described in the publication "The Java Virtual Machine Specification," incorporated by reference above. Each of these six class category vectors 30a, b, c, d, e, f are then inputted into the corresponding neural network 18, 20, 22, 24, 26, and 28 for that class, e.g., the class category input vector 30a comprising the class definition portion of the bytecode 12 is inputted to the class definition neural network 18, the input vector 30b comprising the constant pool portion of the bytecode 12 is inputted to the constant pool neural network 20, etc.

Figure 4:
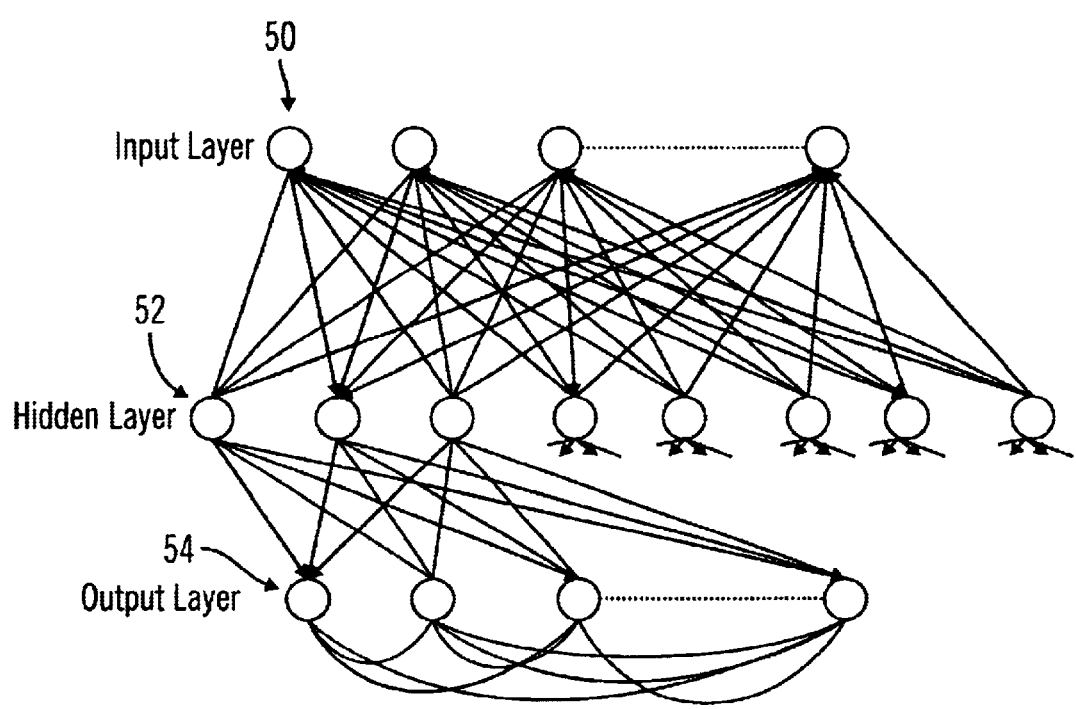
FIG. 4 illustrates an example of a class category neural networks in accordance with certain implementations of the present invention.

In described implementations, each of the class category neural networks 18, 20, 22, 24, 26, 28 comprises a separate neural network utilizing a self-organizing map neural network architecture known in the art, such as the self-organizing map neural network described in the IEEE publication "The Self-Organizing Map," by Teuvo Kohonen, IEEE, vol. 78, no. 9, pgs. 1464–1480 (September 1990). FIG. 4 illustrates the self-organizing neural topology used for each of the class file format neural networks 18, 20, 22, 24, 26, 28. Each of the neural networks 18, 20, 22, 24, 26, and 28 includes an input layer 50 comprising one bit for each bit in the portion of the corresponding input vector 30a, b, c, d, e, f. For instance, each bit of the class definition input vector 30a would be inputted into nodes of the input layer for the class definition neural network 18. The data at the nodes of the input layer 50 are propagated through feedforward connections to nodes of the bidden layer 52. Each node in the hidden layer 52 is fully connected with the input layer 50, in that every input layer node 50 maps to each hidden layer node 52. Weights and adjustments are applied to the data from the input layer 50 nodes when mapping the input nodes to the hidden layer 52. The hidden layer 52 nodes propagate data through fully connected feedforward connections to the output layer 54 nodes. Weights and adjustments are applied to data propagated from the hidden layer 52 to the output layer 54. Lateral connections are constructed among the nodes of the output layer 54 to provide connection therebetween. The neural networks 18, 20, 22, 24, 26, and 28 convert the input nodes into a feature map of binary values or output vectors 32*a, b, c, d, e, f*. The concatenation of the output vectors 32*a, b, c, d, e, f* forms an output vector 34 that uniquely represents the class defined by the bytecode 12.

In preferred embodiments, the weights of the neural networks 18, 20, 22, 24, 26, and 28 are determined by training the nodes using a Self-Organizing Feature Mapping algorithm known in the art. The nodes are trained to produce output vectors 32*a, b, c, d, e, f* for the given input vectors 30*a, b, c, d, e, f* that when combined form output vector 34 as a unique representation of the class.

As discussed, the ACNN 10 considers various input information to categorize the Applet 8 as one of different predetermined category types. In the described implementation, the ACNN 10 considers five different category types, e.g., audio, graphics, security, business, scientific, etc., and estimates the likelihood that the Applet 8 is one of the category types. The estimated likelihood for each of the category types, which comprises a value between 0 and 100, forms the values in the characteristic output vector 40. In further implementations, the ACNN 10 may consider different category types, or fewer or more category types than those described herein. The characteristic output vector 40 includes characteristic values for each of the considered category types, which in the described implementations involves five considered categories.

Figure 5:
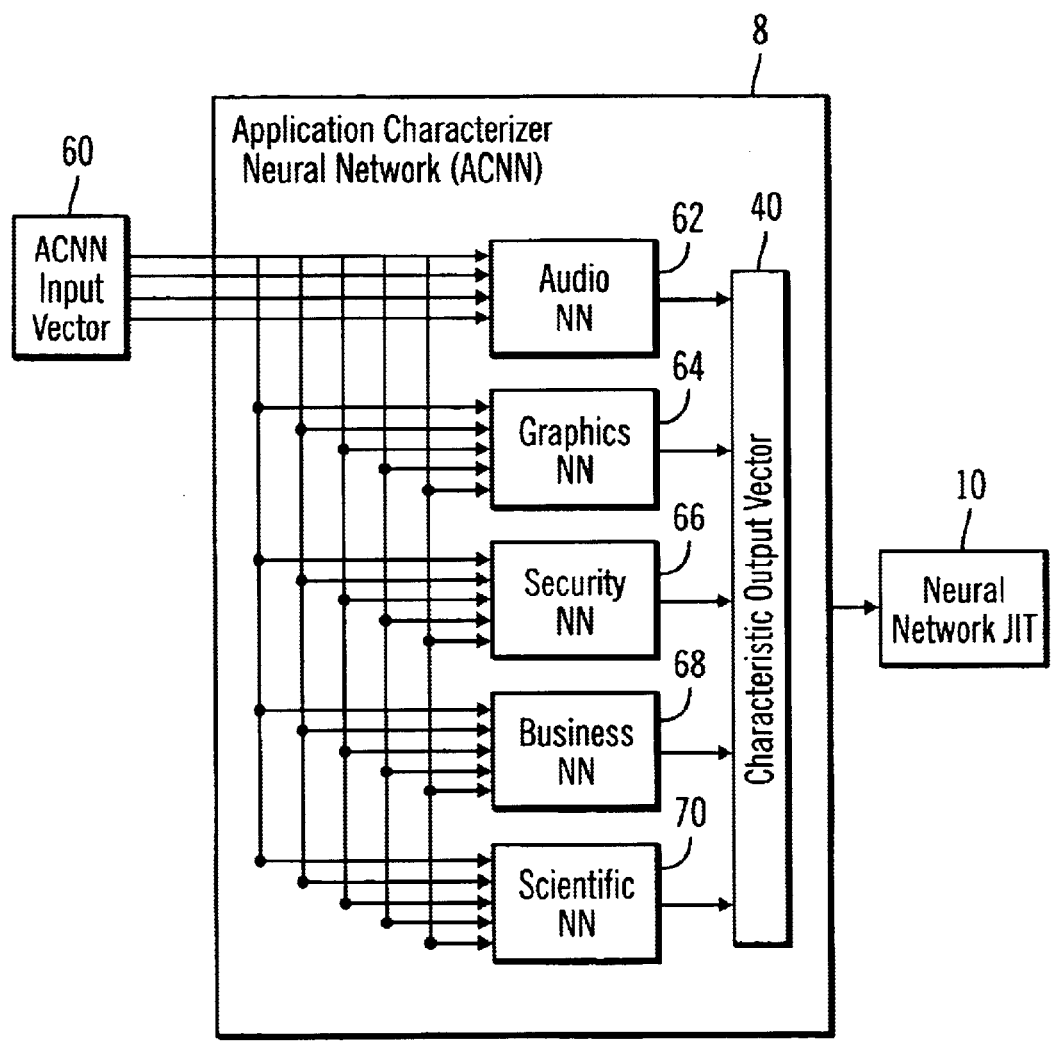
FIG. 5 illustrates an example of an application characterizer neural network module in accordance with certain implementations of the present invention.

FIG. 5 illustrates further detail of the components of the Application Characterizer Neural Network (ACNN) 10 to generate the characteristic output vector 40, which includes a separate neural network for each possible characterization type of the Applet bytecodes 8. In the implementation shown in FIG. 3, the Application Characterizer Neural Network (ACNN) 10 receives an input vector 60 of characterization information on the Applet bytecodes 8. This input vector 60 is then separately provided to five neural network modules, an audio neural network (NN) 62, a graphics neural network (NN) 64, a security neural network (NN) 66, a business neural network (NN) 68, and a scientific neural network (NN) 70. In the described implementations, each of these five neural network modules 62, 64, 66, 68, and 70 are trained using a feedforward back propagation algorithms known in the art.

The ACNN input vector 60 comprises input information that may be gleaned from the applet itself 8, the viewer program 4 in which the applet 8 is executing, and/or the computer system 2. The ACNN 10 or some other program component of the Java Virtual Machine (JVM) 6 includes code to gather the input vector 60 information. In one implementation, the ACNN 8 would gather the following five types of input data to insert in the ACNN input vector 60:

Applet Request Time: In network implementations, the Applet request time would comprise the time the viewer program 4 requested the Applet 8. For instance, if the viewer program 4 is rendering an HTML, extensible markup language (XML), Dynamic HTML (DHTML), or any other interchangeable structured document, then the Applet request time could be the time the viewer program 4, in response to reading the Applet tag and instruction to load the Applet from a remote or local URL, requested the Applet 8 from the remote URL. Alternatively, the Applet request time may comprise the time at which the JVM 6 component of the viewer program 8 begins processing the accessed Applet 8.

Security: A security level indicates a security classification that may be included in information provided with the Applet 8 or determined by the way in which the Applet is loaded. For instance, Applets loaded from over the Internet have higher security restrictions and cannot read and write to system files, whereas Applets loaded from local storage can read and write to system files. The security classification may indicate the URL from which the Applet 8 was loaded. In implementations where the viewer program 4 is capable of rendering HTML, XML, DHTML, etc., files, the security information may also be obtained from the page including the Applet tag from which the Applet 8 was loaded.

Client Infrastructure: Indicates the operating system platform of the computer system 2 in which the viewer program 4 is executing.

Applet Keywords: The keywords are terms providing descriptive information on the functions performed by the Applet 8. The keywords may be obtained from the class name of the Applet 8 in the Applet tag in the page from which the Applet 8 is loaded or other file from which the Applet 8 is loaded. Alternatively, the keywords may be obtained from the content in the file from which the Applet 8 was loaded, such as the metatags for the HTML, XML page. Still further the keywords may be provided as parameters with the Applet for the ACNN 10 to use.

Requester Profile: Provides identification information on the user of the computer system 2 in which the Applet 8 is being rendered. Profile information may be obtained from user login information. If a server computer is providing the Applet 8 to a client computer 2, then the server computer may determine the requester profile based on the Internet Protocol (IP) address. The server computer may then encode the determined requester profile information into the page from which the Applet 8 was loaded or the Applet 8.

In certain implementations, the ACNN 10 may determine all of the above input information as discussed above. In network implementations a server computer receives a request from the computer system 2 over a network, such as the Internet, for an HTML page including the Applet tag link to the Applet 8. In such network implementations, the server computer may determine all of the above input information and then encode the page including the Applet tag or the Applet 8 with the above input information. For instance, the Applet request time may be the time the server computer receives the request from the client 2 for the file. The server may also encode the applet keywords in the page from which the Applet is loaded and/or the Applet. Still further, the server may determine the requestor profile from the IP address and related registration information. Yet further, in network implementations, certain information, such as the security and client infrastructure input information, may be determined at the client 2. In either case, the above described input information is gathered and placed into the ACNN input vector 60 to provide to the neural network modules 62, 64, 66, 68, and 70.

Preferably the nodes of the ACNN 10 neural networks 62, 64, 66, 68, and 70 are trained to produce output vectors that provide probability values indicating the likelihood that the Applet 8 is of a particular category. In certain implementations, each of the ACNN neural networks 62, 64, 66, 68, and 70 may produce a probability value between 0 and 100 indicating the likelihood that the Applet 8 is of a particular category type. In other implementations, the ACNN neural networks 62, 64, 66, 68, and 70 may produce output where only one of the values from one of the neural networks 62, 64, 66, 68, and 70 is one and the other values are zero, thereby indicating the most likely category type based on the input vector 60 values. The ACNN output vector 40 is fed into the Recurrent Neural Network Converter (RCCN) 36.

The RCCN 36 comprises a recurrent neural network structure known in the art, including feed back nodes. The RCCN 36 is trained through an iterative process, using standard recurrent neural network back-prolongation techniques, to convert the output vectors 34 and 40 from the NNJIT neural networks 18, 20, 22, 24, 26, and 28 and ACNN neural networks 62, 64, 66, 68, and 70 into machine code 14 for the input bytecode 12. Examples of back-propagation techniques that may be used to train the RCCN 36 are described in the publication "Neural Networks: A Comprehensive Foundation," by Simon Haykin, pgs. 519–526 (Macmillan Publishing Co., 1994).

Figure 6:
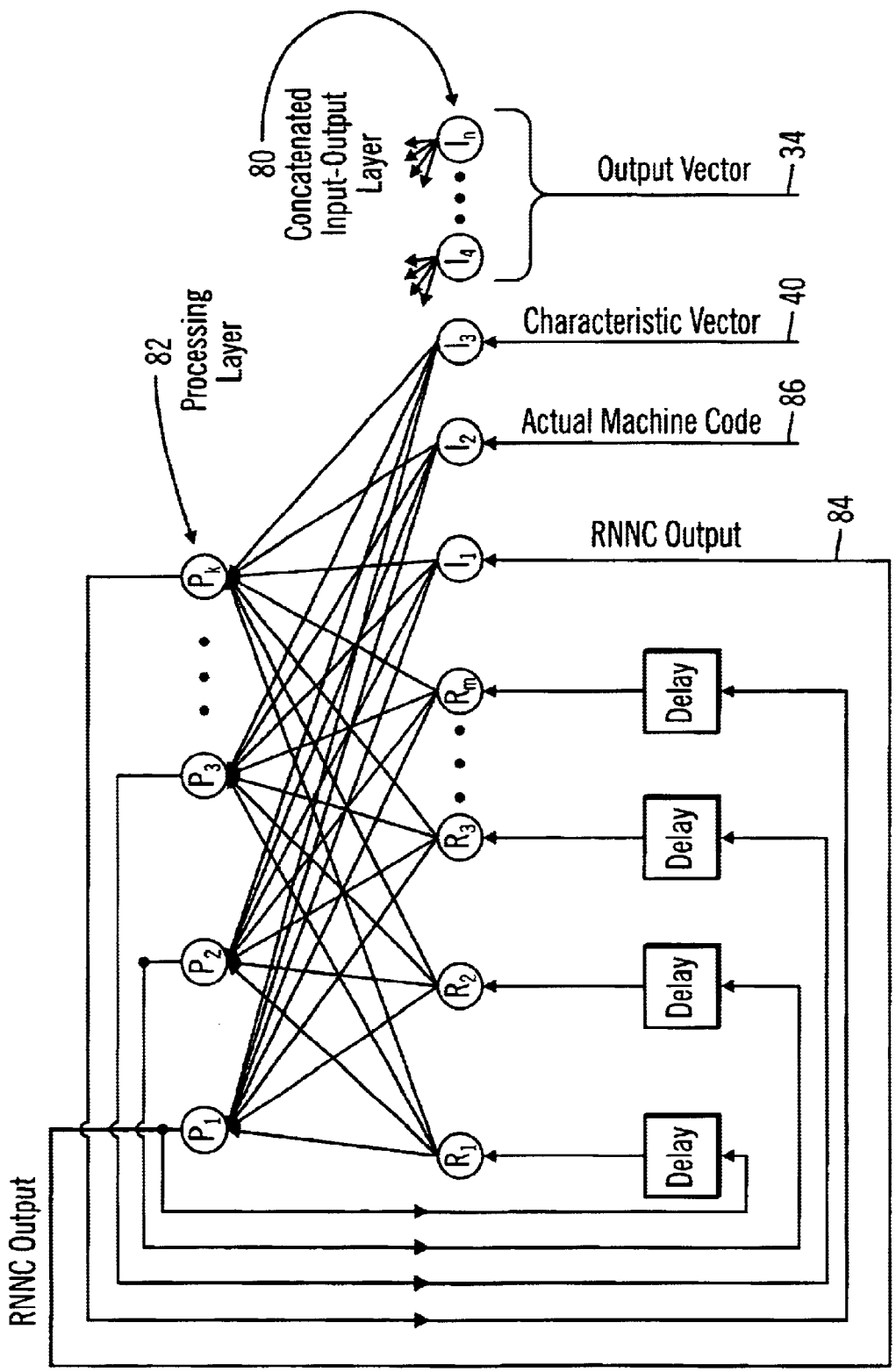
FIG. 6 illustrates a Recurrent Neural Network Converter (RNNC) in accordance with certain implementations of the present invention.

FIG. 6 illustrates an example of an implementation of the RCCN 36. The RCCN 36 includes a concatenated input-output layer 80 and a processing layer 82 including hidden and output neurons. The input to the RCCN 36 includes the characteristic output vector 40 received at input $I_3$ and the output vector 34 at input nodes $I_4$ to $I_n$. Based on these inputs, the RCCN 36 generates RCCN output 84 which would comprise the native machine code 14 for the Applet bytecodes 8.

Weights are applied to map the characteristic output vector 40 received at input $I_3$ and the NNJIT output vector 34 at input nodes $I_4$ to $I_n$ to the processing layer 72 nodes $P_1$ to $P_k$. The RCCN output 84 comprises the native machine code 14 as determined by the RCCN 36. The other input nodes including the actual native machine code 86, known beforehand, and the RCCN output 84 are used as input to train the RCCN 36. All the input nodes $I_1$ to $I_n$ are fully interconnected with the processing layer nodes $P_1$ to $P_k$. During training, the output from the processing layer 72 nodes is propagated as feedback to recurrent nodes $R_1$ to $R_m$ through time delay units $TD_1$ to $T_m$ that delay the input to the recurrent nodes $R_1$ to $R_m$ by one time step.

The weights used in the RCCN 36 may be determined by training the RCCN 36 to generate native machine code 14 for a class based on the output vector 34 from the neural networks 18, 20, 22, 24, 26, 28 that provides a unique representation of the class. Numerous iterations are performed using the output vector 34, the characteristics vector 40, the actual native machine code 86 (known beforehand), the output 84 of the RCCN 36 (which comprises the estimated native machine code 14 generated at the last iteration of the RCCN 36), and feedback to the recurrent nodes $R_1$ to $R_m$ to train and adjust the weight matrix of the RCCN 36 using a recurrent back propagation neural network training algorithm known in the art. This calculated weight matrix may then be applied to data from the nodes propagated between the concatenated input-output layer 70 and processing layer 72 to generate the native machine code 14.

The developer would have to train the class category neural networks 18, 20, 22, 24, 26, and 28 using self-organized map training techniques known in the art to generate a mapping that maps the Applet bytecode 8 of a class to a binary unique representation of that class. The ACNN neural networks 62, 64, 66, 68, 70 may be trained using a feed forward back propagation algorithm known in the art. The developer would further train the RCCN 36 using recurrent back-propagation training algorithms known in the art, utilizing feedback from the processing layer 82, to generate a mapping that would map the output vector 34 to the native machine code 14.

After generating the mappings for the neural networks, the Java Virtual Machine 6 may be implemented as software or in hardware logic on a VLSI chip. For software implementations, the Java Virtual Machine code 6 would include the neural network weight mappings for each of the NNJIT neural networks modules 18, 20, 22, 24, 26, 28, and 30 and the ACNN neural network models 62, 64, 66, 68, 80 to map the output vector 34 and characteristic output vector 40 received at input nodes $I_4$ to $I_n$ data at the input nodes to the native machine code 14. In preferred embodiments, the neural networks may be implemented in the Just-In-Time compiler portion of the Java Virtual Machine 6 to provide a quick mapping of the Applet bytecodes 8 of a class to the native machine code 14. If new Java classes are added, then the developer will have to retrain the neural networks and generate new software including new neural network mappings based on the retraining to map the new class to native machine code. In such software implementations, the developer would have to provide program updates or fixes incorporating the mappings for new classes.

Figure 7:
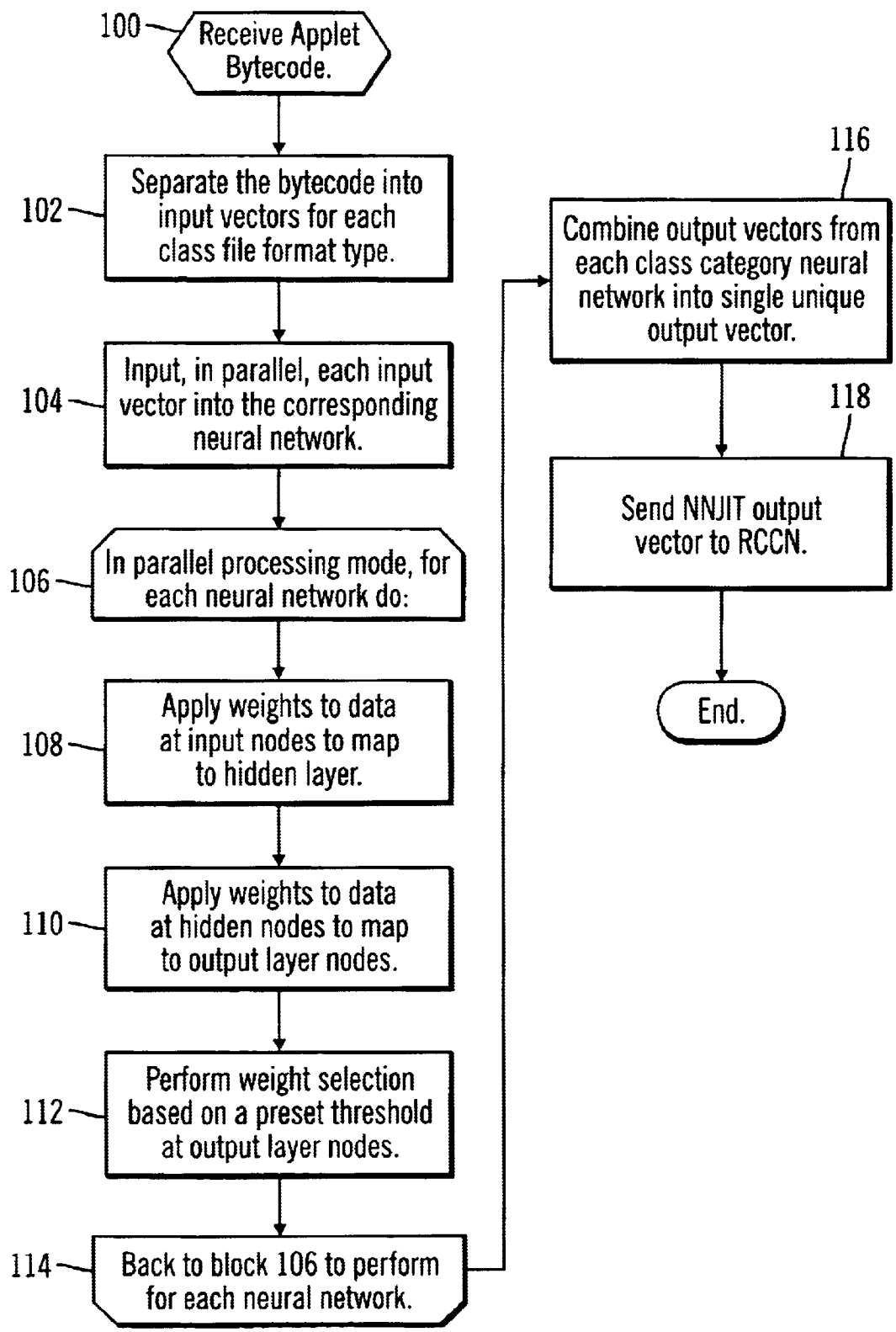
FIGS. 7 and 8 illustrates logic implemented in the Neural Network JIT to convert Java Applet bytecodes to native machine code in accordance with certain implementations of the present invention.

FIG. 7 illustrates the one implementation of the logic to convert the Applet bytecode 8 into native machine code 14. Control begins at block 100 with the Java Virtual Machine 6 receiving the Applet bytecode 8 implementing a Java Applet class. The data separator 16 component of the Java Virtual Machine 4 parses (at block 102) the bytecode into separate input vectors 30a, b, c, d, e, f containing the bits of the bytecode 12 for each class category. The data separator 16 maintains predefined information on the bit locations of the different class file format types in the bytecode 12 to separate the bytecode into separate input vectors for each class file format type. These class category input vectors 30a, b, c, d, e, f would then be inputted (at block 104) into their respective neural networks 18, 20, 22, 24, 26, and 28, such that each bit of the input vectors would be placed at a node of the input layer of the corresponding class category neural network. The input vectors 30a, b, c, d, e, f may be entered into their class category neural networks 18, 20, 22, 24, 26, and 28, respectively, in parallel.

Block 106 represents the beginning of a parallel process for each class information neural network 18, 20, 22, 24, 26, 28 to map the input vectors 30a, b, c, d, e, f to output vectors 32a, b, c, d, e, f. For each neural network, predetermined weights are applied (at block 108) to map the data at the input nodes to the hidden layer and weights are then applied (at block 110) to map the data at the hidden layer nodes 52 to the output layer 54 nodes. The neural network 18, 20, 22, 24, 26, and 28 then selects (at block 112) weights based on a preset threshold, defined in the self-organizing map algorithm, for use at the output layer nodes. Control proceeds (at block 114) back to block 106 if there are further neural networks 18, 20, 22, 24, 26, and 28 that need to process the bytecodes.

The output vectors 32a, b, c, d, e, f for each class category neural network 18, 20, 22, 24, 26, 28 are then combined (at block 116) to form an output vector 34 which provides a unique representation of the class formed by the bytecode 12. Each bit from the output vector 34 is then sent (at block 118) to the RCCN 36 to be used as input, at input nodes $I_4$ to $I_n$.

Figure 8:
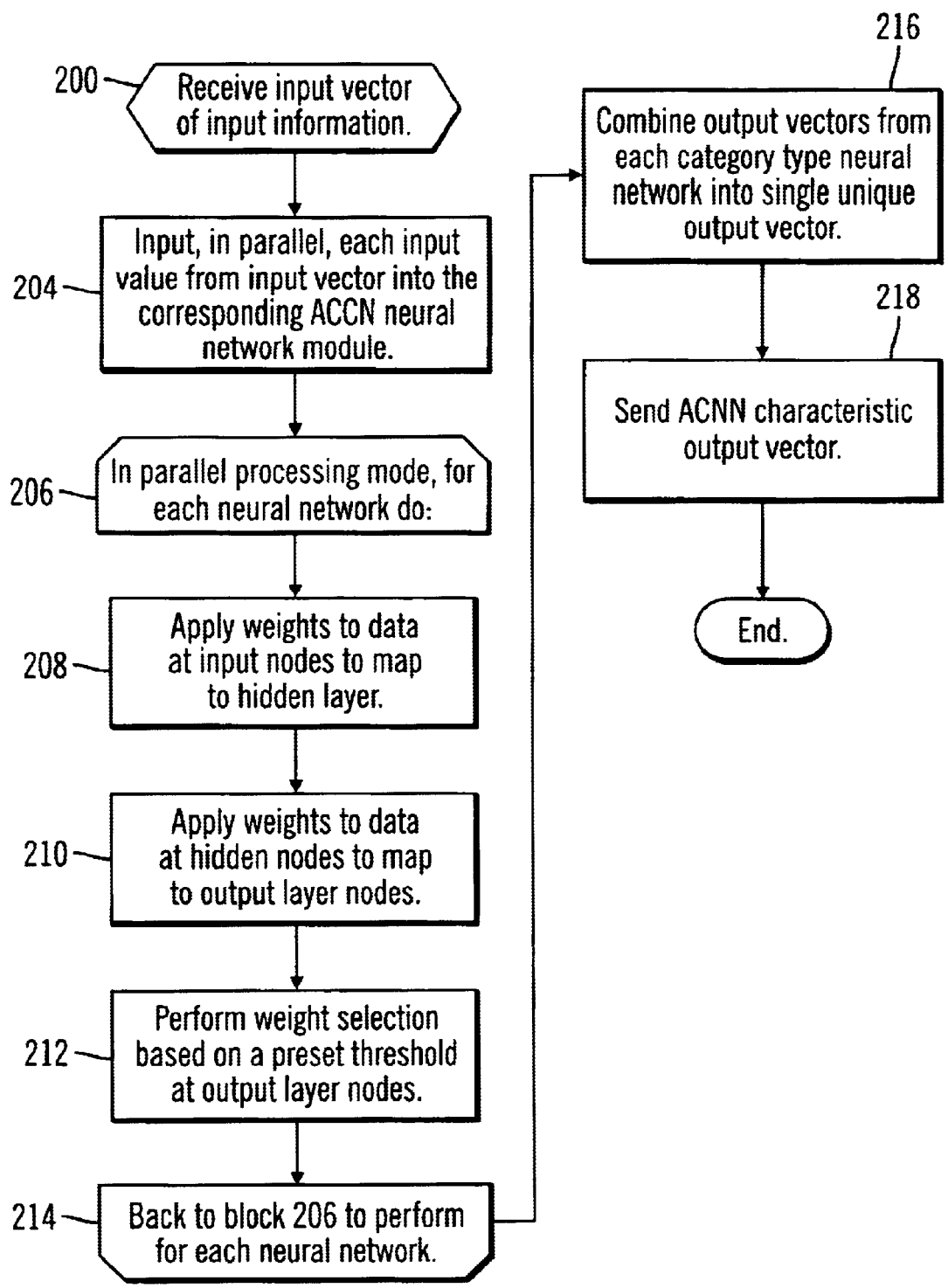

FIG. 8 illustrates logic similar to the steps described with respect to FIG. 7 to process in parallel the contents of the ACNN input vector 60 at the separate ACNN neural network nodes 62, 64, 66, 68, and 70 (FIG. 5) to map the data to the hidden layer where weights are applied to map the data to output layer nodes to produce the characteristic output vector 40. The RCCN 36 receives the output vector 34 from the NNJIT component 8 and the characteristic output vector 40 from the ACNN 6 and then applies the predetermined weights at the processing layer nodes to map the output vectors 34 and 40 to the native machine code 14.

In VLSI implementations, the NNJIT neural networks 18, 20, 22, 24, 26, 28, 30 and ACNN neural networks 62, 64, 66, 68, and 70 may be encoded in one or more integrated circuits. In such case, each node of the neural networks may be formed as a capacitor in the VLSI. The VLSI implementation of the NNJIT neural networks 18, 20, 22, 24, 26, 28, 30 and ACNN neural networks 62, 64, 66, 68, and 70 may comprise a digital, analog or hybrid VLSI. Further, with a VLSI implementation, the weights and mappings of the NNJIT neural networks 18, 20, 22, 24, 26, 28, 30 and ACNN neural networks 62, 64, 66, 68, and 70 may be trained as new Java classes are provided. Upon receiving a new Java class, the user can set the VLSI chip to learn mode to train the NNJIT neural networks 18, 20, 22, 24, 26, 28, 30 and ACNN neural networks 62, 64, 66, 68, and 70 to produce a unique representation of the bytecode for the new Java class. The user would further set the VLSI chip to train the RCCN 36 to produce native machine code 14 from the output vectors 34 and 40. After training the VLSI chip to recognize new Java classes, the VLSI would be encoded to include the newly trained ACNN 8, NNJIT 10, and RCCN 36 neural network modules, which can then be used to generate native machine code for the new Java class according to the logic of FIGS. 7 and 8. In such embodiments, the VLSI could comprise a programmable chip, a filled programmable gate array (FPGA) or complex programmable logic device (CPLD). In this way, the VLSI logic would allow for the training and updating of the neural networks in the VLSI chip to map new bytecodes for new classes to native machine code. Alternatively, the neural networks may be implemented in non-programmable logic, such as application specific integrated circuits (ASICs), which are typically less expensive than the programmable logic devices.

The described implementations utilize neural networks to map Java Applet bytecodes to native machine codes without having to use the Java Interpreter. Utilizing the neural networks reduces processing time because the Just-In-Time neural network of the preferred embodiments provides a quick mapping from bytecodes to native machine code and utilizes parallel processing techniques to further reduce processing time. Further, with VLSI implementations, the chip implementing the preferred embodiment neural network architecture may comprise programmable logic that is capable of being retrained to map bytecodes for new classes to the machine code for such new classes.

Following are some alternative implementations for the preferred embodiments.

The described implementations include a method, apparatus or program using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The discussed implementations described a method, system, and program for using neural networks to provide a conversion of Java Applet bytecodes to native machine code. Additionally, the neural network architecture of the preferred embodiments may be used to compile the source or other intermediary code for computer languages other than Java Applets and for classes implemented in object oriented computer languages other than Java.

The described implementations provided a specific architecture and node arrangement for the self-organizing NNJIT neural networks 18, 20, 22, 24, 26, 28, 30, the ACNN neural networks 62, 64, 66, 68, and 70 and the RCCN 36. However, those skilled in the art will appreciate that alternative node arrangement, including the use of more or fewer layers of nodes, may be used with the described neural network architecture.

The described implementations utilized particular types of neural networks, such as self-organizing maps and recurrent neural networks. However, in alternative embodiments different types of neural networks other than those described herein may be used to perform the mappings from source or intermediary code to native machine code.

In the described implementations, the Java bytecode was separated into six class information related categories in order to provide input for the neural network mapping to the unique class representation. Alternatively, the bytecode may be separated according to different characterizations of the bytecode, including characterizations unrelated to the Java class file format of the bytecode. Similarly, the characterization input was described as including five different category types. In alternative implementations, a different number and type of categories may be considered to define the application program for the RCCN program.

The class category neural networks 18, 20, 22, 24, 26, and 28 are described as implemented using separate neural networks and a self-organizing mapping technique. Alternatively, the separate class category neural networks may be aggregated into fewer neural networks or multiplied into a greater number of neural networks. Further, the class category neural networks may utilize neural network architectures other than the self-organized mapping techniques.

In the described implementations, Applet bytecodes are converted to object code. Additionally, the neural networks implementations described herein may be used to convert source code to object code or convert source code to an intermediary code form. Additionally, the preferred embodiment technique may be used to convert any application program code, not just Java Applets, to executable native machine code.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a compiler to map application program code to object code capable of being executed on an operating system platform, comprising:
    determining attributes of the application program from information on the application program;
    training a first neural network module to generate characteristic output based on input information comprising the determined attributes of the application program;
    training a second neural network module to receive as input the application program code and the characteristic output and, in response, generate object code; and
    using the first and second neural network modules to convert the application program code to object code.

2. The method of claim 1, wherein the application program code comprises a Java Applet bytecode implementing a Java Applet class.

3. The method of claim 1, wherein the second neural network module comprises a first and second neural network components, wherein training the second neural network module further comprises:
    training the first neural network component to map the application program code to a unique representation of the application program code; and
    training the second neural network component to generate executable code from the unique representation of the application program code and the characteristic output.

4. The method of claim 3, wherein the first neural network module comprises a plurality of component neural networks, wherein training the component neural networks of the first module comprises:
    parsing the application program code into a plurality of input vectors; and
    assigning each input vector to one of the component neural networks of the first module, wherein each of the component neural networks of the first module are trained to convert the assigned input vector to an output vector, wherein the combination of the output vectors from each component neural network forms a unique representation of the application code.

5. The method of claim 4, wherein the application program code comprises a Java Applet bytecode implementing a Java Applet class, and wherein parsing the application program into a plurality of input vectors, comprises parsing the application program code into categories based on the bytecode class file format, wherein each input vector includes bits from the bytecode that comprise one of the categories.

6. The method of claim 3, wherein the second neural network component comprises a recurrent neural network, and wherein training the second neural network component comprises performing iterations inputting the unique representation of the application program code and the characteristic output to the second neural network component to generate the object code, wherein the generated object code is fed back into the second neural network component until the second neural network component is capable of mapping the unique representation of the code set to the object code with a minimal amount of error in the mapping.

7. The method of claim 1, wherein the characteristic output categorizes the application program as one of a plurality of application category types.

8. A method for generating a compiler to map application program code to object code capable of being executed on an operating system platform, comprising:
    training a first neural network module comprising a plurality of characterization neural networks:
        (i) determining attribute information of the application program code; and
        (ii) transmitting the attribute information to each characterization neural network to determine an application type to which the application program is capable of belonging, wherein the characteristic output indicates the application type for the application program
    training a second neural network module to receive as input the application program code and the characteristic output and, in response, generate object code; and
    using the first and second neural network modules to convert the application program code to object code.

9. The method of claim 8, wherein the application types to which the application program is capable of belonging includes at least one of a business type, scientific type, audio type, graphics type, and security type.

10. The method of claim 8, wherein the attribute information for the application program includes at least one of a request time, security level, the operating system platform type, descriptive terms describing aspects of the application program, and the system user profile.

11. The method of claim 10, wherein the operating system platform is implemented in a client computer that downloads the application program from a server over a network to execute, and wherein the request time comprises the time the client computer requested the application program from the server.

12. The method of claim 10, wherein the operating system platform is implemented in a computer that accesses the application program from a local storage device to execute, and wherein the request time comprises the time the computer executed the application program.

13. The method of claim 8, wherein the characteristic output indicates a likelihood that the application program is each of a set of application types.

14. A method for mapping application program code to object code capable of being executed on an operating system platform, comprising:
    determining attributes of the application program from information on the application program;
    receiving the application program code with a first neural network module;
    generating, with the first neural network module, characteristic output based on input information comprising the determined attributes of the application program; and
    receiving, with a second neural network module, the application program code and the characteristic output and generating therefrom the object code.

15. The method of claim 14, wherein the second neural network module comprises a first and second neural network components, further comprising:

mapping, with the first neural network component, the application program code to a unique representation of the application program code; and generating, with the second neural network component, an executable code from the unique representation of the application program code and the characteristic output.

16. The method of claim 15, wherein the first neural network module comprises a plurality of characterization neural networks, and wherein generating the characteristic output comprises:

determining attribute information of the application program code; and transmitting the attribute information to each characterization neural network to determine an application type to which the application program belongs.

17. The method of claim 13, wherein the second neural network component comprises a plurality of neural networks, wherein converting the application program code to the unique representation with the second neural network component comprises:

parsing the application program code into a plurality of input vectors;

assigning each input vector to one of the neural networks of the second neural network component;

converting, with each of the neural networks in the second neural network component, the assigned input vector to an output vector; and combining the output vectors to form a unique representation of the code set.

18. The method of claim 14, wherein the characteristic output categorizes the application program as one of a plurality of application category types.

19. A system for mapping application program code to object code capable of being executed on an operating system platform, comprising:

(a) a first neural network module including logic that performs:
  (i) receiving the application program code;
  (ii) determining attributes of the application program from information on the application program;
  (iii) generating characteristic output based on input information comprising the determined attributes of the application program; and (b) a second neural network module including logic that performs:
  (i) receiving the application program code and the characteristic output; and
  (ii) generating from the received application program code and the characteristic output the object code.

20. The system of claim 19, wherein the second neural network module comprises:

a first neural network component including logic mapping the application program code to a unique representation of the application program code; and a second neural network component including the logic generating the object code from the unique representation of the application program code and the characteristic output.

21. The system of claim 20, wherein the second neural network component further comprises:

a plurality of neural networks; and wherein the logic for converting the application program code to the unique representation performs:
  (i) parsing the application program code into a plurality of input vectors;
  (ii) assigning each input vector to one of the neural networks of the second neural network component;
  (iii) converting, with each of the neural networks in the second neural network component, the assigned input vector to an output vector; and
  (iv) combining the output vectors to form a unique representation of the code set.

22. The system of claim 20, wherein the first neural network module further comprises:

a plurality of characterization neural networks; and wherein the logic for generating the characteristic output comprises:
  (i) determining attribute information of the application program code; and
  (ii) transmitting the attribute information to each characterization neural network to determine an application type to which the application program belongs.

23. The system of claim 22, wherein the application types to which the application program is capable of belonging includes at least one of a business type, scientific type, audio type, graphics type, and security type.

24. The system of claim 22, wherein the attribute information for the application program includes at least one of a request time, security level, the operating system platform type, descriptive terms describing aspects of the application program, and the system user profile.

25. The system of claim 22, wherein the characteristic output indicates a likelihood that the application program is each of a set of application types.

26. The system of claim 19, wherein the neural network modules are implemented in a software program.

27. The system of claim 26, wherein the software program is implemented in a Java Just-In-Time Compiler component of a Java Virtual Machine.

28. The system of claim 19, wherein the neural network modules are implemented in at least one integrated circuit device.

29. The system of claim 19, wherein the characteristic output categorizes the application program as one of a plurality of application category types.

30. An article of manufacture for generating a compiler to map application program code to object code capable of being executed on an operating system platform, wherein the article of manufacture includes training code capable of causing a processor to perform:

determining attributes of the application program information on the application program;

training a first neural network module to generate characteristic output based on input information comprising the determined attributes of the application program; and training a second neural network module to receive as input the application program code and the characteristic output and, in response, generate object code.

31. The article of manufacture of claim 30, wherein the second neural network module comprises a first and second neural network components, and wherein the training code for training the second neural network module further comprises:

training the first neural network component to map the application program code to a unique representation of the application program code; and training the second neural network component to generate executable code from the unique representation of the application program code and the characteristic output.

32. The article of manufacture of claim 31, wherein the second neural network component comprises a recurrent neural network, and wherein training the second neural network component comprises performing iterations inputting the unique representation of the application program code and the characteristic output to the second neural network component to generate the object code, wherein the generated object code is fed back into the second neural network component until the second neural network component is capable of mapping the unique representation of the code set to the object code with a minimal amount of error in the mapping.

33. The article of manufacture of claim 30, wherein the first neural network module comprises a plurality of component neural networks, wherein the training code for training the first neural network module further performs:

parsing the application program code into a plurality of input vectors; and assigning each input vector to one of the component neural networks, wherein each of the component neural networks are trained to convert the assigned input vector to an output vector, wherein the combination of the output vectors from each component neural network forms a unique representation of the application code.

34. The article of manufacture of claim 33, wherein the application program code comprises a Java Applet bytecode implementing a Java Applet class, and wherein parsing the application program into a plurality of input vectors, comprises parsing the application program code into categories based on the bytecode class file format, wherein each input vector includes bits from the bytecode that comprise one of the categories.

35. The article of manufacture of claim 30, wherein the characteristic output categorizes the application program as one of a plurality of application category types.

36. An article of manufacture for generating a compiler to map application program code to object code capable of being executed on an operating system platform, wherein the article of manufacture includes training code capable of causing a processor to perform:

training a first neural network module comprising a plurality of characterization neural networks by:
 (i) determining attribute information of the application program code;
 (ii) transmitting the attribute information to each characterization neural network to determine an application type to which the application program is capable of belonging, wherein the characteristic output indicates the application type for the application program; and training a second neural network module to receive as input the application program code and the characteristic output and, in response, generate object code.

37. The article of manufacture of claim 36, wherein the application types to which the application program is capable of belonging includes at least one of a business type, scientific type, audio type, graphics type, and security type.

38. The article of manufacture of claim 36, wherein the attribute information for the application program includes at least one of a request time, security level, the operating system platform type, descriptive terms describing aspects of the application program, and the system user profile.

39. The article of manufacture of claim 36, wherein the characteristic output indicates a likelihood that the application program is each of a set of application types.

* * * * *

UNITED STATES PATENT AND TRADEMARK OFFICE
CERTIFICATE OF CORRECTION

PATENT NO. : 6,826,550 B2  Page 1 of 1
APPLICATION NO. : 09/737337
DATED : November 30, 2004
INVENTOR(S) : Michael Wayne Brown and Chung Tien Nguyen It is certified that error appears in the above-identified patent and that said Letters Patent is hereby corrected as shown below:

Column 12, line 18, delete "networks:", and add -- networks by: --.

Column 13, line 21, delete "claim 13", and add -- claim 14 --.

Column 14, line 54, after "program", add -- from --.

Signed and Sealed this

Twelfth Day of September, 2006

JON W. DUDAS
*Director of the United States Patent and Trademark Office*